United States Patent [19]
Dziersk et al.

[11] Patent Number: 5,251,744
[45] Date of Patent: Oct. 12, 1993

[54] STORAGE ASSEMBLAGE FOR INDEX PRINT SHEETS AND CASSETTES

[75] Inventors: Mark D. Dziersk, Simsbury; William H. Valls, Harwinton, both of Conn.

[73] Assignee: Eastman Kodak Company, Rochester, N.Y.

[21] Appl. No.: 3,153

[22] Filed: Jan. 12, 1993

[51] Int. Cl.$^5$ .................................... B65D 85/672
[52] U.S. Cl. .................... 206/232; 206/225; 206/391; 206/408; 206/425; 206/455
[58] Field of Search .............. 40/124, 124.1, 124.2, 40/124.4, 152, 152.1, 154, 156, 157, 158.1, 159, 159.2; 206/0.8, 0.81-0.84, 45.34, 216, 225, 232, 223, 333, 387, 389, 391, 408, 409, 425, 444, 457, 461-483, 459.5, 559-565, 578, 581, 449, 450, 454-456; 242/71, 71.1, 71.7; 281/21, 22, 26, 28, 31, 51; 434/429

[56] References Cited

U.S. PATENT DOCUMENTS

| | | | |
|---|---|---|---|
| 3,278,015 | 10/1966 | Bernstein | 206/47 |
| 3,628,269 | 12/1971 | Dahl | 40/68.6 |
| 3,710,487 | 1/1973 | Saltz | 40/72 |
| 4,378,068 | 3/1983 | Bell | 206/461 |
| 4,629,067 | 12/1986 | Pavlik et al. | 206/425 |
| 4,684,019 | 8/1987 | Egly | 206/444 |
| 4,844,260 | 7/1989 | Jaw | 206/444 |
| 4,965,948 | 10/1990 | Ruebens | 40/159 |
| 5,161,907 | 11/1992 | Byrne | 206/455 |

Primary Examiner—Jimmy G. Foster
Attorney, Agent, or Firm—Roger A. Fields

[57] ABSTRACT

A storage assemblage is disclosed for cassettes each of which contains an image bearing medium having recorded images and for index print sheets each of which has printed pictures that match the images on the image bearing medium in one of the cassettes. According to the invention, there is provided envelopes each of which is dimensioned to store an index print sheet with its printed pictures visible, holders each of which is shaped to store a cassette and includes means for engaging an envelope substantially at one of its edges to affix the holder to the envelope and for disengaging the envelope to release the holder from the envelope, and a storage base for the envelopes and the holders. Respective means on the envelopes and the storage base movably support the envelopes mutually aligned with their edges at which the holders engage the envelopes being located outermost. Thus, the holders when engaged with the envelopes can be grasped to move the envelopes relative to one another to laterally separate one envelope from another in order to view the printed pictures on an index print sheet in an envelope.

5 Claims, 4 Drawing Sheets

STORAGE ASSEMBLAGE FOR INDEX PRINT SHEETS AND CASSETTES

CROSS-REFERENCE TO RELATED APPLICATIONS

Reference is made to commonly assigned copending applications Ser. No. 08/003,362 entitled PACKAGE FOR INDEX PRINT SHEET AND CASSETTE, and filed Jan. 12, 1993 in the names of D. E. Hansen and W. H. Valls, and Ser. No. 08/003,155 entitled STORAGE ASSEMBLAGE FOR INDEX PRINT SHEETS AND CASSETTES, and filed Jan. 12, 1993 in the names of D. E. Hansen and W. H. Valls.

BACKGROUND OF THE INVENTION

1. Field of the Invention

The invention relates to a storage assemblage for cassettes each of which contains an image bearing medium having recorded images and for index print sheets each of which has printed pictures that match the images on the image bearing medium in one of the cassettes.

2. Description of the Prior Art

Generally, a processing laboratory gives the customer a processed photographic negative film and photographs which are enlarged and printed from the film. The negative film is usually cut into several sections, each one containing the same number of negatives and inserted into an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a mid-line. This flexing can possibly damage the index print sheet. The cassette is stored in an interior pocket raised from the base. This arrangement makes the container rather bulky.

THE CROSS-REFERENCED APPLICATIONS

Cross-referenced application Ser. No. 08/003,362 discloses a package for a cassette containing an image bearing medium having recorded images and for an index print sheet having printed pictures that match the images on the image bearing medium. The package comprises an envelope for storing the index print sheet with its pictures visible and a holder for the cassette. Respective means are located on the envelope and the holder for engaging to affix the envelope and the holder to each other and for disengaging to release one from the other. Alternatively, the holder can be secured directly to the index print sheet rather than via the envelope.

Cross-referenced application Ser. No. 09/003,155 discloses a storage assemblage for cassettes each of which contains an image bearing medium having recorded images and for index print sheets each of which has printed pictures that match the images on the image bearing medium. The storage assemblage comprises holders for the cassettes each of which includes connection means for securing a holder to one of the index print sheets and fulcrum means engageable to permit the holder and an index print sheet secured to it to be pivoted at the fulcrum means. A binder for storing the holders and the index print sheets includes fixed support means for releaseably engaging the fulcrum means of each of the holders to store the holders and the index print sheets inside the binder and to permit one of the holders and an index print sheet secured to it to be pivoted away from the others to view the printed pictures on the index print sheet and to be released from engagement with the fixed support means to obtain a cassette from the holder.

SUMMARY OF THE INVENTION

A storage assemblage for cassettes each of which contains an image bearing medium having recorded images and for index print sheets each of which has printed pictures that match the images on the image bearing medium in one of the cassettes, said storage assemblage comprising:

envelopes each of which is dimensioned to store an index print sheet with its printed pictures visible;

holders each of which is shaped to store a cassette and includes means for engaging an envelope substantially at one of its edges to affix the holder to the envelope and for disengaging the envelope to release the holder from the envelope;

a storage base for the envelopes and the holders; and respective means on the envelopes and the storage base for movably supporting the envelopes mutually aligned with their edges at which the holders engage the envelopes being located outermost, whereby the holders when engaged with the envelopes can be grasped to move the envelopes relative to one another to laterally separate one envelope from another in order to view the printed pictures on an index print sheet in an envelope.

DETAILED DESCRIPTION OF THE PREFERRED EMBODIMENT

Figure 1:
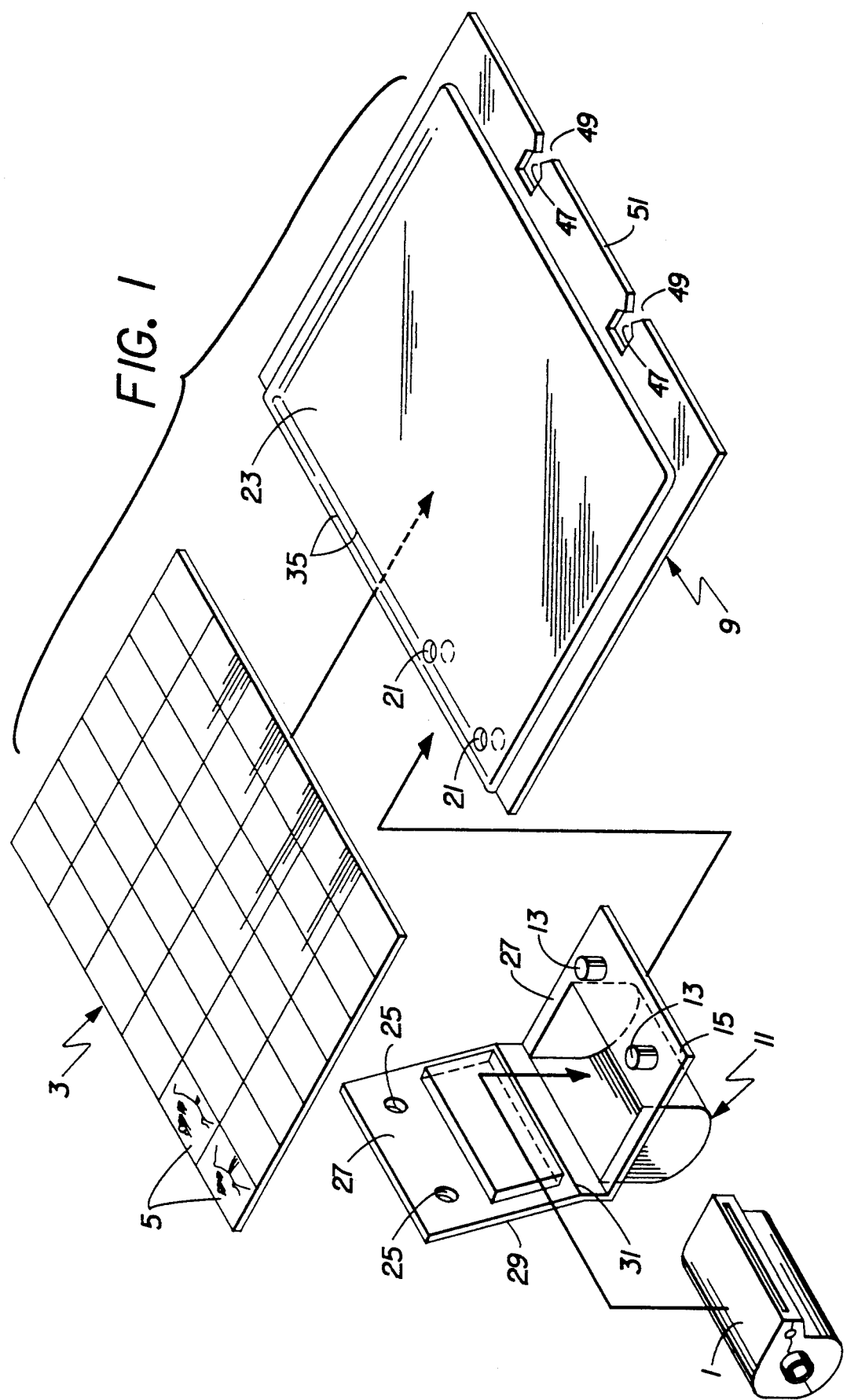
FIG. 1 is a perspective view of a holder for a cassette and an envelope for an index print sheet, showing how the holder is opened to receive the cassette, how the index print sheet is inserted into the envelope, and how the holder and the envelope are secured together.
Figure 2:
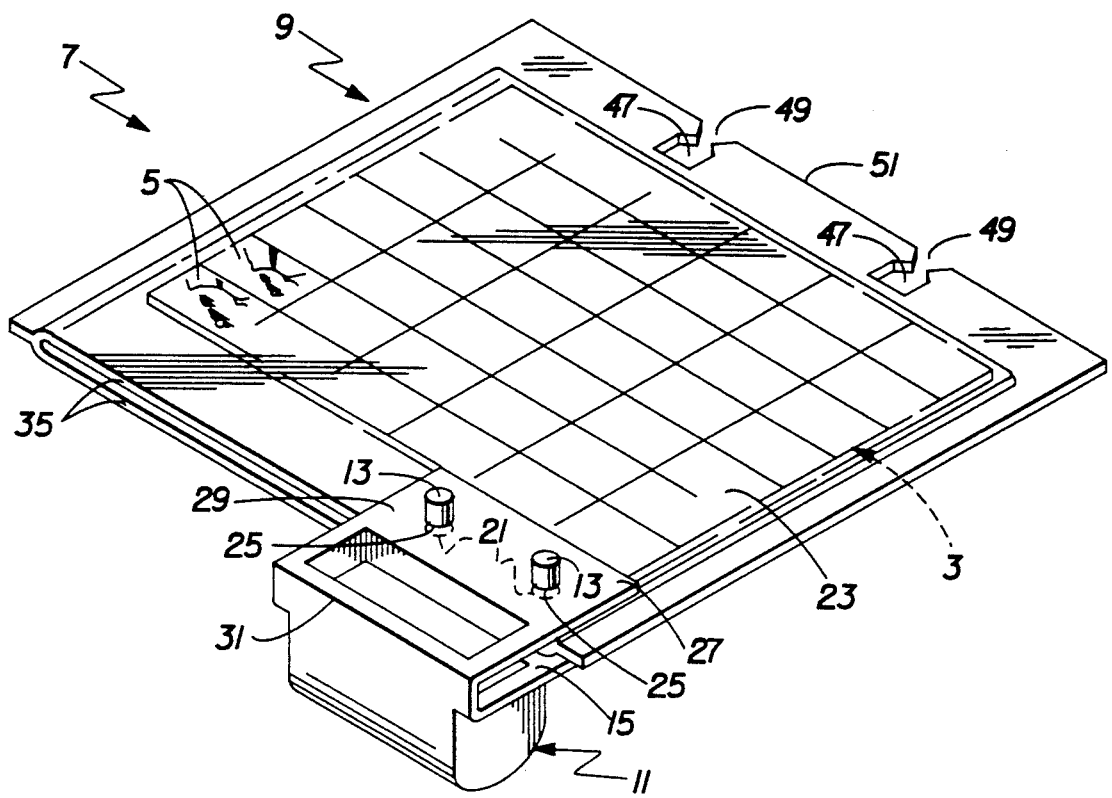
FIG. 2 is a perspective view of the holder with the cassette in it and the envelope with the index print sheet in it secured together.

Referring to FIGS. 1 and 2, a 35mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 holds a rolled filmstrip, not shown, having a series of successively numbered negatives.

An index print sheet 3 similar to the one disclosed in U.S. Pat. No. 4,966,285, issued Oct. 30, 1990, has a series of pictures 5 printed on its underside in FIGS. 1 and 2 that match the negatives on the filmstrip inside the cassette 1. The pictures 5 are numbered in accordance with numbering of the negatives.

Figure 3:
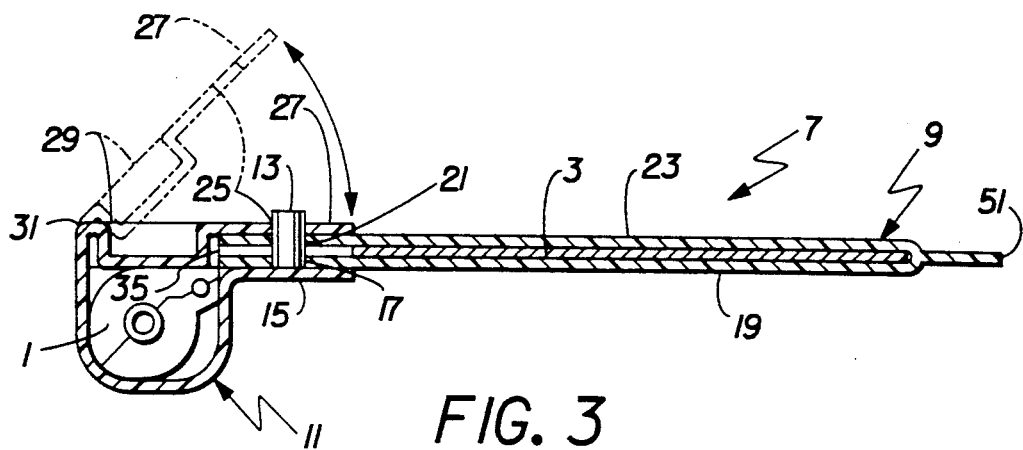
FIG. 3 is a sectional view similar to FIG. 2.

A package 7 for the cassette 1 and the index print sheet 3 is shown in FIGS. 1-3. The package 7 comprises a transparent page-like plastic envelope 9 for storing the index print sheet 3 with its pictures 5 visible through the envelope, and a transparent or opaque plastic holder 11 shaped similar to the shape of the cassette 1 to hold the cassette inside the holder. The holder 11 includes a pair of identical integral studs 13, 13 that project from a lip-like extension 15 of the holder through respective holes 17 (only one shown) in one side 19 of the envelope 9 and through respective holes 21, 21 in another side 23 of the envelope to affix the holder and the envelope to each other. See FIG. 3. Respective holes 25, 25 in a lip-like extension 27 of a cover portion 29 of the holder 11 receive the two studs 13 to secure the holder closed. An integral living hinge 31 of the holder 11 permits the cover portion 29 to be swung to open the holder.

The envelope 9 is open only along a longitudinal edge 35 to insert the index print sheet 3 between the two sides 19 and 23 of the envelope and to remove the sheet from the envelope. As shown in FIG. 3, the longitudinal edge 35 of the envelope 9 is located between the two lip-like extensions 15 and 27 of the holder 11 when the studs project through the respective holes 17 (only one shown) and 21, 21 in the two sides 19 and 23 of the envelope and through the respective holes 25, 25 in the cover portion 29 of the holder. Consequently, the index print sheet cannot be removed from the envelope 9.

Rather than securing the holder 11 to the index print sheet 3 via the envelope 9, the holder can be connected directly to an index print sheet 37 having a series of pictures 39 which are the same as the pictures 5 on the top side of the index print sheet 3. See FIG. 4. The index print sheet 37 has a pair of holes 41, 41 for receiving the respective studs 13, 13 of the holder 11 to connect the holder to the index print sheet similar to the way the holder is connected to the envelope 9 as shown in FIGS. 2 and 3.

Figure 4:
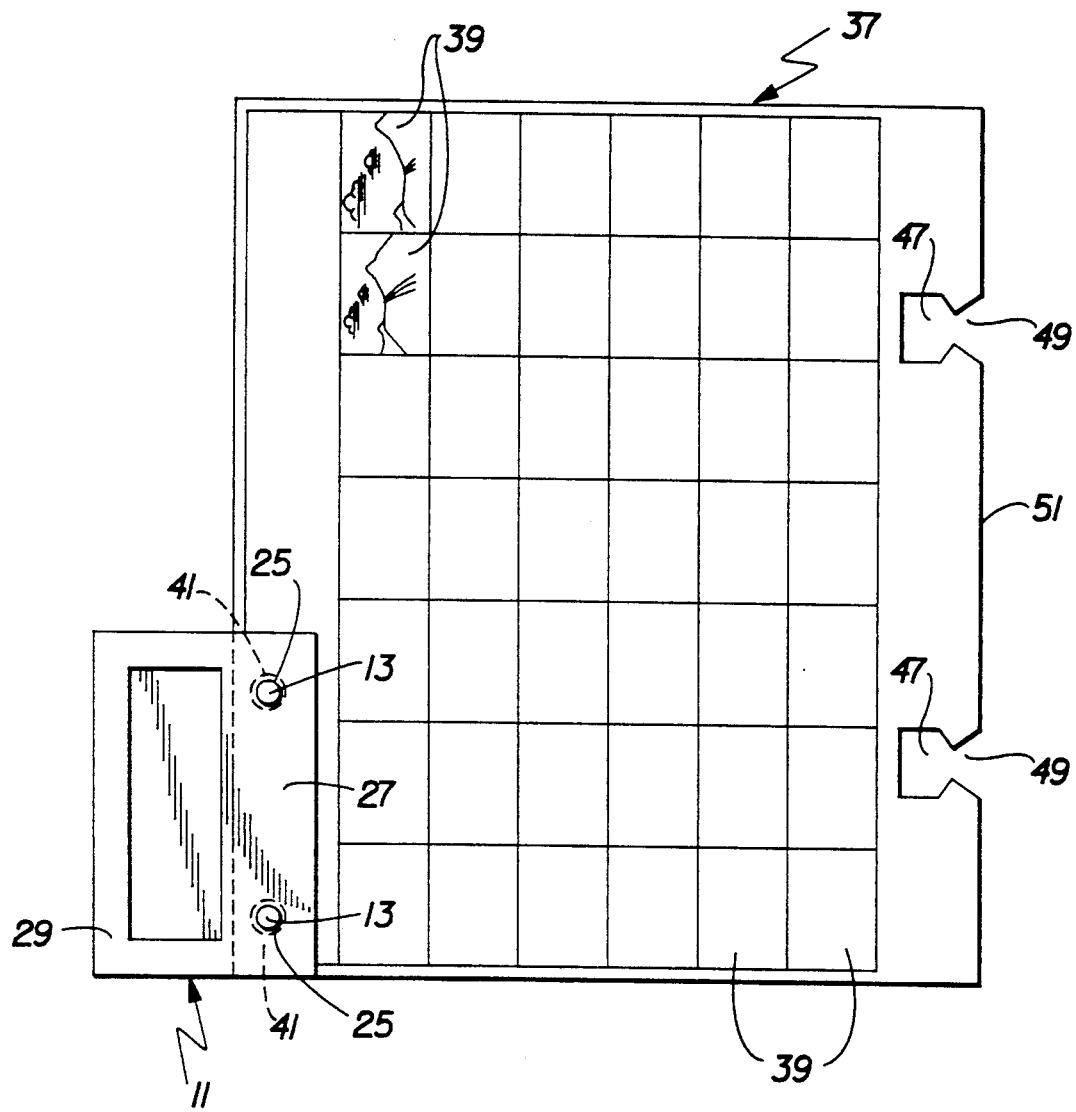
FIG. 4 is a top plan view of the holder with the cassette in it secured directly to the index print sheet rather than via the envelope.
Figure 5:
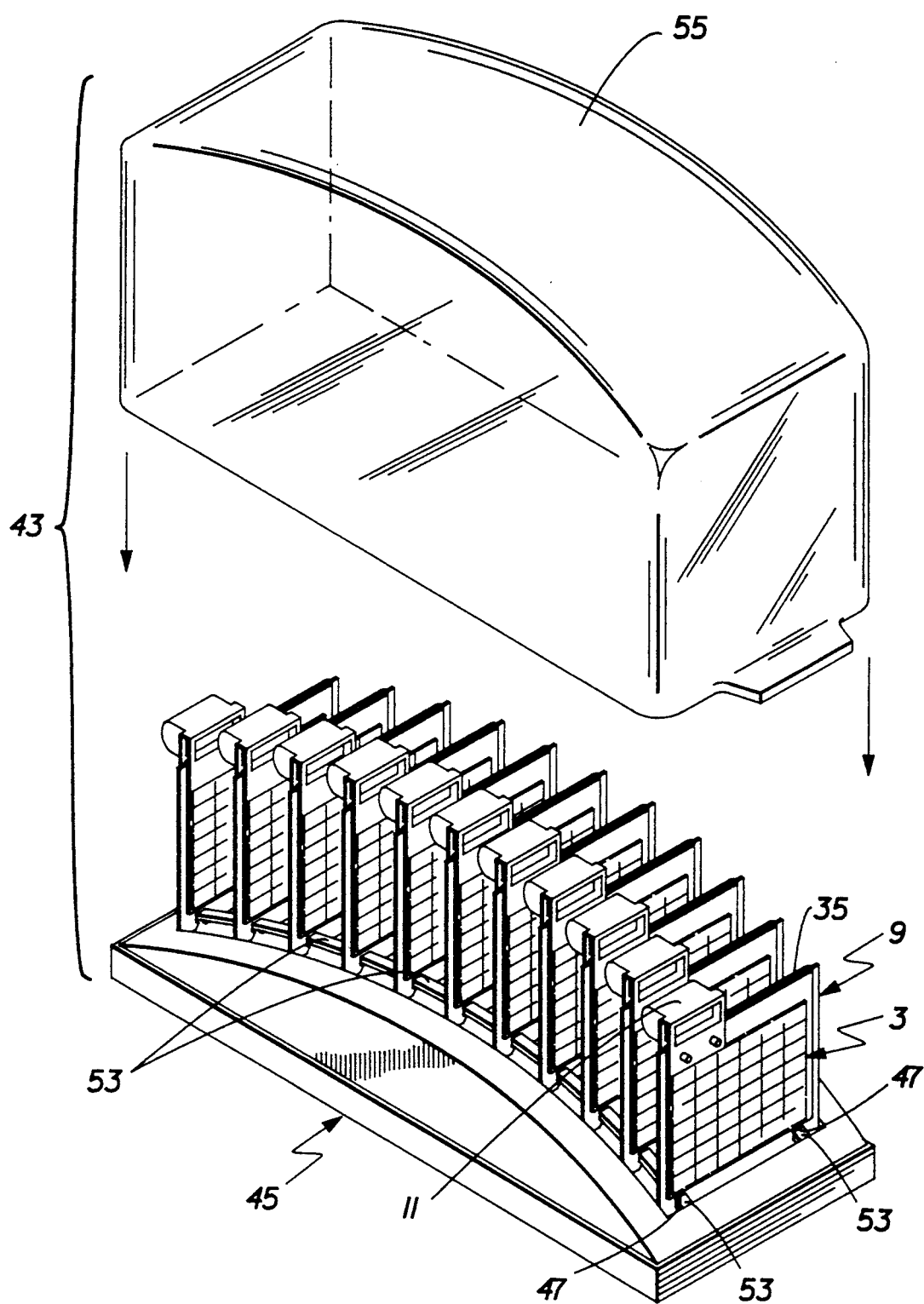
FIG. 5 is a partly-exploded perspective view of a storage assemblage including envelopes and holders, according to a preferred embodiment of the invention.

A storage assemblage 43 is shown in FIG. 5. The storage assemblage 43 in addition to what has been described includes a box-like storage base 45 for envelopes 9 and holders 11 as shown in FIGS. 1-3 (or for holders 11 and index print sheets 37 as shown in FIG. 4). Each of the envelopes 9 as shown in FIGS. 1 and 2 (and each of the index print sheets 37 as shown in FIG. 4) has a pair of identical notches 47 with respective inwardly tapered openings 49 at a longitudinal edge 51 that is opposite the longitudinal edge 35 as shown in FIGS. 1 and 2 (or is opposite the longitudinal edge 42 as shown in FIG. 4). The storage base 45 has a pair of identical parallel mounting rails 53, 53 shaped to be received in the notches 47 to movably support the envelopes 9 (or the index print sheets 37) mutually aligned upright, one after the other, with the holders 11 being located uppermost as shown in FIG. 5. As a result, the holders 11 can be manually grasped to laterally separate one envelope 9 from another (or one index print sheet 37 from another) to view the printed pictures 5 (or 39). Moreover, the envelopes 9 (or the index print sheets 37) can be individually removed from the rails 53, 53 by lifting them off the rails. Preferably, a transparent cover 55 is provided as shown in FIG. 5.

The invention has been described with reference to a preferred embodiment. However, it will be appreciated that variations and modifications can be effected within the ordinary skill in the art without departing from the scope of the invention.

We claim:

1. A storage assemblage for cassettes each of which contains an image bearing medium having recorded images and for index print sheets each of which has printed pictures that match the images on the image bearing medium in one of the cassettes, said storage assemblage comprising:

envelopes each of which is dimensioned to store an index print sheet with its printed pictures visible;

holders each of which is shaped to store a cassette and includes means for engaging an envelope substantially at one of its edges to affix the holder to the envelope and for disengaging the envelope to release the holder from the envelope;

a storage base for said envelopes and said holders; and respective means on said envelopes and said storage base for movably supporting the envelopes mutually aligned with their edges at which said holders engage the envelopes being located outermost, whereby said holders when engaged with said envelopes can be grasped to move the envelopes relative to one another to laterally separate one envelope from another in order to view the printed pictures on an index print sheet in an envelope.

2. A storage assemblage as recited in claim 1, wherein said respective supporting means on said envelopes and said storage base are adapted to support the envelopes upright with their edges at which said holders engage the envelopes being located uppermost.

3. A storage assemblage as recited in claim 2, wherein said supporting means on said envelopes are located substantially at edges of said envelopes opposite from the edges of the envelopes at which said holders engage the envelopes.

4. A storage assemblage as recited in claim 3, wherein said supporting means on said envelopes includes notches in the envelopes having respective openings at the edges of the envelopes opposite from the edges of the envelopes at which said holders engage the envelopes, and said supporting means on said storage base includes a mounting rail shaped to be received in said notches through their openings to support said envelopes for movement of one relative to another and to permit an envelope to be removed from said mounting rail.

5. A storage assemblage comprising:

cassettes each of which contains an image bearing medium having recorded images;

index print sheets each of which has printed pictures that match the images on said image bearing medium in one of said cassettes;

holders each of which is shaped to store a cassette and includes means for an index print sheet substantially at one of its edges to affix the holder to the index print sheet and for disengaging the index print sheet to release the holder from the index print sheet;

a storage base for said index print sheets and said holders; and respective means on said index print sheets and said storage base for movably supporting the index print sheets mutually aligned with their edges at which said holders engage the index print sheets being located outermost, whereby said holders when engaged with said index print sheets can be grasped to move the index print sheets relative to one another to laterally separate one index print sheet from another in order to view the printed pictures on the index print sheet.

* * * * *